UNITED STATES PATENT OFFICE.

THOMAS LEOPOLD WILLSON AND MAXIMILIAN MATTHIAS HAFF, OF OTTAWA, ONTARIO, CANADA; SAID HAFF ASSIGNOR TO SAID WILLSON.

PROCESS OF PRODUCING CALCIUM SILICID.

934,379.  Specification of Letters Patent.  Patented Sept. 14, 1909.

No Drawing.  Application filed April 2, 1909. Serial No. 487,488.

*To all whom it may concern:*

Be it known that we, THOMAS LEOPOLD WILLSON and MAXIMILIAN MATTHIAS HAFF, both of the city of Ottawa, in the county of Carleton, Province of Ontario, Canada, have invented a certain new and useful Improvement in Processes for Producing Calcium Silicid, of which the following is a specification.

Our invention relates to an improved process for producing calcium silicid, and the objects of our invention are to produce calcium silicid at a much less cost than hitherto possible.

Calcium silicid is useful for the desulfurizing, dephosphorizing and deoxidizing of metals, but it is an exceedingly tedious process to manufacture the same by any hitherto known method and is practically prohibitive.

According to the present invention, an alkaline earth compound is mixed with silica and caused to re-act by heat of the electric arc.

In the present method of carrying out the invention, a metallic carbid of an alkaline earth, such as calcium carbid is mixed with silica and enough free carbon added to satisfy the oxygen of the silica. We have found that when calcium carbid is employed, satisfactory proportions for the mixture would be as follows:

Calcium carbid ____ 64 parts.
    Silica _____ 120 parts.
    Carbon _____ 24 parts.

The above described mixture is subjected to a sufficient amount of heat to effect reduction of the silica and combination therewith of the calcium.

To produce the calcium silicid, we have found that practically the only means that can be employed to secure the requisite degree of heat is the electric arc, but it is evident, that if it could be secured in any other way, the re-action would occur with equal facility. The resultant product is a calcium silicid, presumably having the formula $CaSi_2$, but, it is to be understood that the process might under certain circumstances result in the production of other proportions of calcium and silicon than is expressed by the formula $CaSi_2$. It is believed however, that the re-action will be according to the following equation.

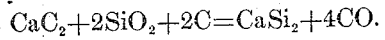

$$CaC_2 + 2SiO_2 + 2C = CaSi_2 + 4CO.$$

As many changes could be made in the above process, and many apparently widely different embodiments of our invention within the scope of the claims could be made without departing from the spirit or scope thereof, it is intended that all matter contained in the accompanying specifications, shall be interpreted as illustrative and not in a limiting sense.

It may also be mentioned that the term "metal carbid of alkaline earth" is intended to include other carbines than that of calcium, such as for example, barium carbid.

What we claim as our invention is:—

1. The herein described process of producing a compound containing an alkaline earth metal and silicon, which comprises heating a metallic carbid of an alkaline earth with silica under proper conditions to produce a compound containing calcium and silicon.

2. The herein described process of producing a compound containing an alkaline earth metal and silicon, which comprises heating a metallic carbid of an alkaline earth with silica in the electric arc.

3. The herein described process of producing a compound containing an alkaline earth metal and silicon, which comprises heating calcium carbid with silica.

4. The herein described process of producing a compound containing an alkaline earth metal and silicon, which comprises heating together calcium carbid, silica and carbon.

5. The herein described process of producing a compound containing an alkaline earth metal and silicon, which comprises subjecting a mixture of calcium carbid, silica and carbon to the action of the electric arc.

In witness whereof, we have hereunto set our hands in the presence of two witnesses.

THOMAS LEOPOLD WILLSON.
MAXIMILIAN MATTHIAS HAFF.

Witnesses:
RUSSELL S. SMART,
WM. A. WYMAN.